(12) United States Patent
Xuening et al.

(10) Patent No.: US 11,746,711 B2
(45) Date of Patent: Sep. 5, 2023

(54) PULSE WIDTH MODULATION DRIVE FOR STAGED FUEL MANIFOLDS

(71) Applicant: Pratt & Whitney Canada Corp., Longueuil (CA)

(72) Inventors: Lu Xuening, Oakville (CA); Ezzat MeshkinFam, Mississauga (CA); Sean Durand, Brossard (CA); Antwan Shenouda, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/401,295

(22) Filed: Aug. 12, 2021

(65) Prior Publication Data

US 2023/0050741 A1 Feb. 16, 2023

(51) Int. Cl.
*F02C 9/32* (2006.01)
*F02C 7/22* (2006.01)
*F02C 7/228* (2006.01)

(52) U.S. Cl.
CPC ............... *F02C 9/32* (2013.01); *F02C 7/222* (2013.01); *F02C 7/228* (2013.01); *F05D 2220/32* (2013.01); *F05D 2240/35* (2013.01)

(58) Field of Classification Search
CPC .. F02C 7/222; F02C 7/228; F02C 9/26; F02C 9/32; F02C 9/34
See application file for complete search history.

(56) References Cited

U.S. PATENT DOCUMENTS

| | | |
|---|---|---|
| 3,946,551 A | 3/1976 | Linebrink et al. |
| 4,640,093 A | 2/1987 | Eastman |
| 4,716,719 A * | 1/1988 | Takahashi ................. F23R 3/34 60/773 |
| 6,016,832 A | 1/2000 | Vars et al. |
| 7,665,305 B2 | 2/2010 | Cornwell et al. |
| 7,726,951 B2 | 6/2010 | Jansen et al. |
| 9,140,190 B2 | 9/2015 | Portolese et al. |
| 2003/0217545 A1* | 11/2003 | Parsons ..................... F23K 5/06 60/739 |
| 2004/0079071 A1* | 4/2004 | Rehn ....................... F02C 9/266 60/39.465 |
| 2005/0241318 A1 | 11/2005 | Buehman et al. |
| 2010/0058733 A1 | 3/2010 | Lawrence et al. |

(Continued)

FOREIGN PATENT DOCUMENTS

| | | |
|---|---|---|
| CN | 108533426 A | 9/2018 |
| WO | 0205046 | 1/2002 |

OTHER PUBLICATIONS

European Search report dated Jan. 9, 2023 for corresponding application No. 22190228.1.

*Primary Examiner* — Scott J Walthour
(74) *Attorney, Agent, or Firm* — NORTON ROSE FULBRIGHT CANADA

(57) ABSTRACT

In accordance with at least one aspect of this disclosure, there is provided a fuel system for a gas turbine engine of an aircraft, including a main inlet feed conduit fluidly connected to a primary manifold feed conduit and a secondary manifold feed conduit. A primary manifold fluidly connects the primary manifold feed conduit to a plurality of primary fuel injectors, and a secondary manifold fluidly connects the secondary manifold feed conduit to a plurality of secondary fuel injectors.

12 Claims, 2 Drawing Sheets

(56) References Cited

U.S. PATENT DOCUMENTS

| | | | |
|---|---|---|---|
| 2012/0085421 A1* | 4/2012 | Bickley | F02C 9/263 |
| | | | 137/2 |
| 2013/0118145 A1* | 5/2013 | Palmer | F03G 6/064 |
| | | | 60/641.14 |
| 2017/0052087 A1* | 2/2017 | Faqihi | G01M 3/243 |

* cited by examiner

PULSE WIDTH MODULATION DRIVE FOR STAGED FUEL MANIFOLDS

TECHNICAL FIELD

The present disclosure relates to fuel control for gaseous fuel in staged manifolds, for example in an aircraft engine.

BACKGROUND

Gas turbine engines typically burn liquid fuel (e.g. kerosene) and use on/off staging for turn-down and startup, for example using two manifolds, which does not easily translate to gaseous fuels. Therefore there is always a need in the aerospace industry for more precise control of gaseous fuel flow in gas turbine engines.

SUMMARY

In accordance with at least one aspect of this disclosure, there is provided a fuel system for a gas turbine engine of an aircraft, including a main inlet feed conduit fluidly connected to a primary manifold feed conduit and to a secondary manifold feed conduit. A primary manifold fluidly connects the primary manifold feed conduit to a plurality of primary fuel injectors, and a secondary manifold fluidly connects the secondary manifold feed conduit to a plurality of secondary fuel injectors.

A primary fuel flow valve is disposed in the primary manifold feed conduit, the primary fuel flow valve having an open condition operative to permit flow of fuel through the primary manifold feed conduit and a closed condition operative to inhibit flow of fuel through the primary manifold feed conduit. A secondary fuel flow valve is disposed in the secondary manifold feed conduit, the secondary fuel flow valve having an open condition operative to permit flow of fuel through the secondary manifold feed conduit and a closed condition operative to inhibit flow of fuel through the secondary manifold feed conduit.

A controller is operatively connected to control the primary fuel flow valve and is operable to control the primary fuel flow valve to pulse a flow of fuel passing therethrough in pulse width modulation (PWM) pulses at a low end of a fuel flow range for the primary manifold. In embodiments, the controller is operable to control the secondary fuel flow valve to pulse a flow of fuel passing therethrough in pulse width modulation (PWM) pulses at a low end of a fuel flow range for the secondary manifold. In certain embodiments, the controller can be an electronic engine control (EEC) of a gas turbine engine.

A gaseous fuel source defining an inlet end of the main inlet feed conduit supplies gaseous fuel to the primary manifold via the main inlet feed conduit. A fuel metering mechanism is disposed in the main inlet feed conduit operable to regulate flow through both the main inlet feed conduit and the primary fuel manifold. A flow divider assembly is disposed in the main in-let feed conduit to receive gaseous fuel from the fuel metering mechanism, where the inlet of the flow divider assembly is a branch point for the primary manifold and the secondary manifold to divide the gaseous fuel between the primary manifold and the secondary manifold.

In certain embodiments, a fuel pressure sensor is operatively connected to an inlet of the of the fuel metering mechanism and operable to generate a signal indicative of a fuel pressure at the inlet of the fuel metering mechanism. In certain such embodiments, the controller is operatively connected to the fuel pressure sensor and operable to receive the signal from the fuel pressure sensor. In certain embodiments, the controller is operable to validate whether an inlet pressure is sufficient for operation at the intended operating condition and/or adjust a position of the fuel metering mechanism relative to a gaseous fuel compressibility at a rated pressure.

In certain embodiments, a position feedback sensor is operatively connected to the fuel metering mechanism and operable to generate a signal indicative of a position of the fuel metering mechanism. In certain such embodiments, the controller is operatively connected to the position sensor. In certain embodiments, the controller is operable to control the position of the fuel metering mechanism based on the signal indicative of the position of the fuel metering mechanism.

In certain embodiments, a delta pressure sensor is operatively connected to the inlet of the fuel metering mechanism and outlet of the fuel metering mechanism and operable to generate a signal indicative of a pressure drop across the fuel metering mechanism. In certain such embodiments, the controller is operatively connected to the delta pressure sensor and operable to receive the signal from the delta pressure sensor. In certain embodiments, the controller is operable to measure a gaseous fuel flow rate through the fuel metering mechanism based on the pressure drop and an adjusted position of the fuel metering mechanism.

In certain embodiments, a temperature sensor is operatively connected to the main inlet feed conduit at the outlet of the fuel metering mechanism and operable to generate a signal indicative of a temperature of the gaseous fuel at the outlet of the fuel metering mechanism. In certain such embodiments, the controller is operatively connected to the temperature sensor and is operable to output a temperature correction factor and control the position of the fuel metering mechanism based on the signal indicative of the temperature of the gaseous fuel flow at the outlet of the fuel metering mechanism.

In certain embodiments, a downstream pressure sensor is disposed in the main inlet feed conduit at an inlet of a flow divider assembly downstream of the fuel metering mechanism operable to generate a signal indicative of a fuel pressure at the inlet of the flow divider assembly. In certain such embodiments, the controller is operatively connected to the downstream pressure sensor and operable to receive the signal from the downstream pressure sensor. In certain embodiments, the controller is operable to control the fuel metering mechanism to act as a pressure regulator in low flow operating conditions.

In embodiments, the controller includes machine readable instructions to cause the controller to place the primary fuel control valve and the secondary fuel flow valve in respective closed positions, pressurize the main inlet feed conduit feeding the primary and secondary fuel flow valve valves with gaseous fuel, place the primary fuel flow valve into its open condition to supply the gaseous fuel to fuel injectors of the primary manifold downstream from the primary fuel flow valve, and modulate the primary fuel flow valve between its open and closed position to pulse a flow of gaseous fuel passing therethrough in pulse width modulation (PWM) pulses at a low end of a fuel flow range for the primary manifold.

In certain embodiments, the controller includes machine readable instructions to cause the controller to schedule a PWM dwell time relative to sensed engine conditions, and schedule a position of the fuel metering mechanism relative to a sensed pressure at an inlet of a flow divider assembly.

In certain such embodiments, the sensed engine conditions derive from signals indicative of at least one of: the pressure at the inlet of the fuel metering mechanism, the pressure drop across the fuel metering mechanism, the temperature of the gaseous fuel at the outlet of the fuel metering mechanism, and/or the position of the fuel metering mechanism. In certain embodiments, the sensed pressure at the inlet of the flow divider assembly is derived from a signal indicative of the pressure at the inlet of the flow divider assembly.

In certain embodiments, the controller includes machine readable instructions to cause the controller to modulate the secondary fuel flow valve between its open and closed position to pulse a flow of gaseous fuel passing therethrough in pulse width modulation (PWM) pulses at a low end of a fuel flow range for the secondary manifold to prevent surge or notch when placing the secondary fuel flow valve its opened position.

In accordance with another aspect of this disclosure, there is provided an aircraft having at least one embodiment of the fuel system as described herein, and further including, a gas tur-bine engine having in fluid series communication, a compressor section, a combustor, and a turbine section. An outlet of the main inlet feed conduit fluidly connects to the combustor via the primary and secondary fuel manifolds.

In accordance with yet another aspect of this disclosure, there is provided a flow divider assembly for an aircraft fuel system. The flow divider assembly includes, a flow divider having an inlet operable to divide a flow of gaseous fuel from a main inlet feed conduit into a primary manifold feed conduit and a secondary manifold feed conduit and a pressure sensor disposed in the main inlet feed conduit at the inlet of the flow divider operable to generate a signal indicative of a fuel pressure at the inlet of the flow divider. A primary fuel flow valve is disposed in the primary manifold feed conduit, the primary fuel flow valve having an open condition operative to permit flow of fuel through the primary manifold feed conduit and a closed condition operative to inhibit flow of fuel through the primary manifold feed conduit. A secondary fuel flow valve is disposed in the secondary manifold feed conduit wherein the secondary fuel flow valve has an open condition operative to permit flow of fuel through the secondary manifold feed conduit and a closed condition operative to inhibit flow of fuel through the secondary manifold feed conduit.

A controller is operatively connected to control the primary and secondary fuel flow valves and operable to control the primary and secondary fuel flow valves to pulse a flow of fuel passing therethrough in pulse width modulation (PWM) pulses. In certain embodiments, the controller is operatively connected to the pressure sensor and operable to receive a signal indicative of a pressure at the inlet of the flow divider assembly. In certain such embodiments, the controller is operable to control a fuel metering mechanism to act as a pressure regulator in low flow operating conditions based on the signal indicative of a pressure at the inlet of the flow divider assembly.

In accordance with yet another aspect of this disclosure, there is provided a fuel control method for a gas turbine engine. The method includes placing a primary fuel flow valve and a secondary fuel flow valve in respective closed positions, pressurizing a main inlet feed conduit feeding the primary and secondary fuel flow valves with a flow of gaseous fuel, placing the primary fuel flow valve into an open condition to supply the flow of gaseous fuel to a first plurality of fuel injectors of a primary fuel manifold downstream of the primary fuel flow valve, and modulating the primary flow valve between its open and closed position to pulse a flow of gaseous fuel passing therethrough in pulse width modulation (PWM) pulses at a low end of a fuel flow range for the primary manifold.

In certain embodiments, the method includes, scheduling a PWM dwell time relative to sensed engine conditions, and scheduling a position of the fuel metering mechanism relative to a sensed pressure at an inlet of a flow divider assembly. In certain embodiments, the method includes modulating the secondary fuel flow valve between its open and closed position to pulse a flow of gaseous fuel passing therethrough in pulse width modulation (PWM) pulses at a low end of a fuel flow range for the secondary manifold to prevent surge or notch when placing the secondary fuel flow valve its opened position.

In certain embodiments, the sensed engine conditions derive from signals indicative of at least one of: a pressure at an inlet of the fuel metering mechanism, a pressure drop across the fuel metering mechanism, a temperature of the gaseous fuel at an outlet of the fuel metering mechanism, and/or a position of the fuel metering mechanism. In certain such embodiments, the method includes, controlling a positon of the fuel metering mechanism and the PWM pulses of the first and second flow valves based on the plurality of sensed inputs.

In certain embodiments, the sensed pressure at the inlet of the flow divider assembly is derived from a signal indicative of the pressure at the inlet of the flow divider assembly. In certain such embodiments, the method further includes, controlling the fuel metering mechanism to act as a pressure regulator in low flow operating conditions based on the sensed input.

These and other features of the embodiments of the subject disclosure will become more readily apparent to those skilled in the art from the following detailed description taken in con-junction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
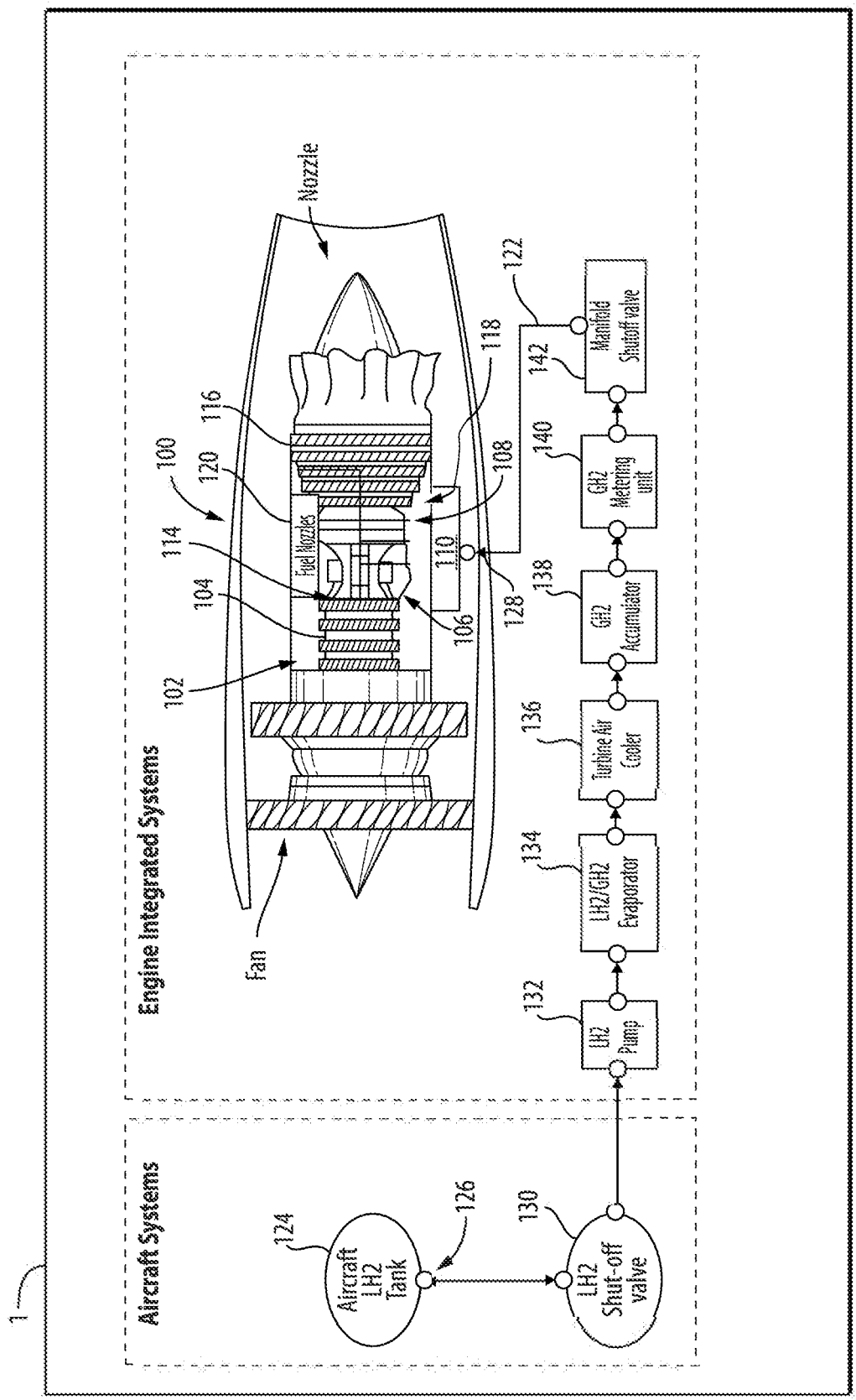
FIG. 1 is schematic cross-sectional side elevation view an aircraft engine in accordance with this disclosure, showing a plurality of fuel components connecting a fuel source to a combustor.
Figure 2:
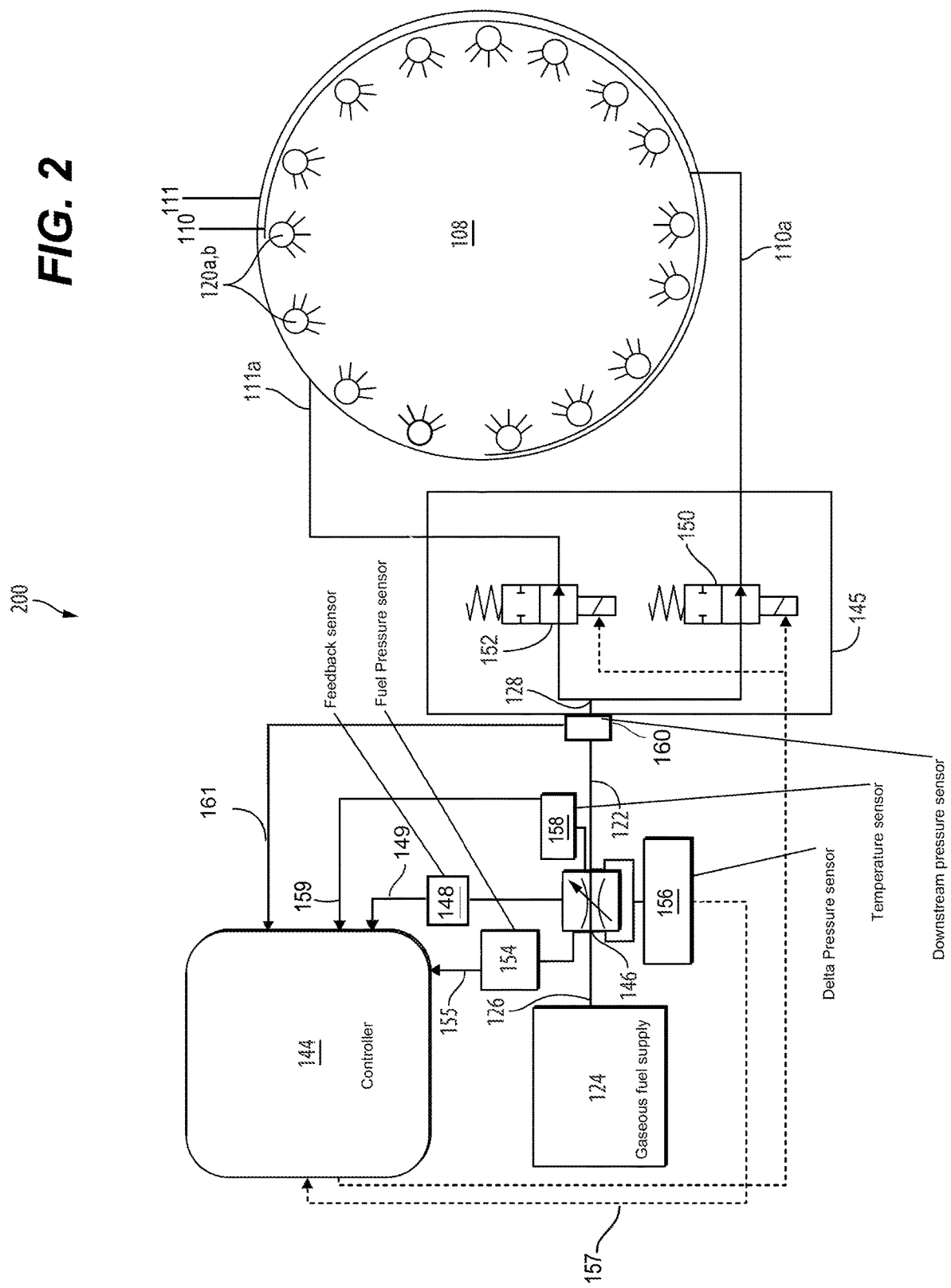
FIG. 2 is a schematic view of an embodiment of a fuel control system for the engine of FIG. 1 constructed in accordance with at least one aspect of this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIG. 2. Certain embodiments described herein can be used to improve control of gaseous fuel flow in a gas turbine engine.

The present disclosure relates generally to fuel control for gas turbine engines, and more particularly to control of gaseous fuel flow. A gas turbine engine may be fueled with gaseous fuel such as hydrogen gas. It is possible to gasify liquid hydrogen from an aircraft supply through an appropriate fuel pump, heat exchangers, pressure regulator, and metering valves. It is desired to control gaseous fuel delivery to the engine such that stable and responsive control over the wide range of flow conditions would be maintained. However, the typical fuel control for aircraft engines is designed for purely liquid fuel flow. Liquid fuel is an incompressible fluid, whereas gaseous fuel is compressible. For hydrogen, the full fuel system can include a combination of liquid and gaseous hydrogen, meaning the fuel control system needs to control both compressible and incompressible flows.

Gas turbine engines typically burn liquid fuel (e.g. kerosene) and use on/off staging for turn-down and startup, for example using two manifolds, which does not easily translate to gaseous fuels. However, when using gaseous fuel, high turn down ratio can render control of the gaseous flow in a low flow regime particularly challenging, for example exposing the engine to a risk of flame out or surging as a result of inaccurate fuel flow supply. Because the gaseous hydrogen is pressurized from the fuel delivering system, the pressure supplied to the fuel line P1 is regulated at a much higher pressure of the burner pressure P3 (e.g. at least double). Therefore, variation of fuel metering valve output sets a variable throat area to the valve which is maintained choked (e.g. in a sonic state) at all system flow conditions.

The fuel control systems and methods as provided herein utilizes pulse width control of fuel flow valves to control pressure for the fuel manifolds at startup, for example, or at any other engine condition in which fine tuning control of fuel pressure is desired. In certain embodiments, the flow valves pulse during start up, first for a primary manifold and later for the secondary manifold. Pulsing allows for stable control of start up to bring both manifolds up to power without loss of control of combustion during start up. Additional metering devices, if included, provides additional pressure control, but may not be as fine tuned as the fuel flow valves.

Accordingly, as will be described herein with greater detail, the aircraft fuel system includes one or more controllable flow valves which can be used to manage and maintain the distribution of the gas flow into the engine (e.g. the fuel manifolds) during starting and large transient maneuvers. For example, the system introduces the ability to actively control the gaseous flow distribution between the primary and secondary manifolds. In the gaseous state, the fuel used for combustion is a compressible media.

In certain embodiments, referring to FIG. 1, an aircraft 1 can include an engine 100, where the engine 100 can be a propulsive energy engine (e.g. creating thrust for the aircraft 1), or a non-propulsive energy engine, and a fuel system. As described herein, the engine 100 is a turbofan engine, although the present disclosure may likewise be used with other engine types. The engine 100 includes a compressor section 102 having a compressor 104 in a primary gas path 106 to supply compressed air to a combustor 108 of the aircraft engine 100. The primary gas path 106 includes a nozzle manifold 110 for issuing fluid to the combustor 108.

The primary gas path 106 includes, in fluid communication in a series: the compressor 104, the combustor 108 fluidly connected to an outlet 114 of the compressor 104, and a turbine section 116 fluidly connected to an outlet 118 of the combustor 108. The turbine section 116 is mechanically connected to the compressor 104 to drive the compressor 104.

The combustor 108 includes a plurality of fuel nozzles 120 (e.g. including a primary set 120a and a secondary set 120b) fluidly connected to the fuel manifold 110, where the primary set 120a is fluidly connected to a primary manifold 110, and the secondary set 120b is fluidly connected to a secondary fuel manifold 111. A main inlet feed conduit 122 fluidly connects a gaseous fuel supply 124 to feed a primary manifold feed conduit 110a and to feed a secondary manifold feed conduit 111a. The main inlet feed conduit 122 includes an inlet end 126 and an outlet end 128 to fluidly connect the gaseous fuel supply 124 to the combustor 108 through the plurality of fuel nozzles 120. In embodiments, the gaseous fuel supply 124 can be any suitable gaseous fuel, such as a gaseous pressure and/or temperature regulated fuel supply, which may be or include hydrogen gas.

Certain additional components may also be included in fluid communication between the combustor and the gaseous fuel supply in any suitable order or combination, such as a fuel shut off valve 130, a fuel pump 132, a liquid/gaseous fuel evaporator 134, a turbine air cooling heat exchanger 136, a gaseous fuel accumulator 138, a gaseous fuel metering unit 140, a fuel manifold shut off valve 142, and/or additional pressure regulating devices. In certain embodiments, the pre-pressurized gaseous fuel accumulator 138 can be used as backup supply pressure source.

Turning now to FIG. 2, a fuel control system 200 for controlling the flow of fuel to the aircraft engine 100 through the main inlet feed conduit 122 and the plurality of fuel nozzles 120 includes a means for regulating flow through the main inlet feed conduit 122, a means for generating a signal indicative of an engine state or condition, and a controller 144. The controller 144 is operatively connected to the means for regulating flow and to the means for generating a signal to control the means for regulating a signal based on the signal such that the controller is operable to control a state of the means for regulating to achieve a desired power output (e.g. a command from a pilot, autopilot, or drone software for acceleration of the engine 100).

As described herein, the means for regulating flow through the main inlet feed conduit 122 can include any suitable means, for example the regulating means can be or include at least one fuel regulator 146 (which may also be referred to herein as a fuel metering mechanism 146). The fuel regulator 146 may include, for example only, an electronic metering valve, an electro-pneumatic metering valve, a combination of valves and/or other devices. The means for generating a signal indicative of an engine state or condition can include any suitable means, for example any number and/or combination of pressure sensors, temperature sensors, position sensors, or the like, disposed in the engine 100 and/or main inlet feed conduit 122, and operatively connected as disclosed herein.

As shown in FIG. 2, the fuel metering mechanism 146 is disposed in the main inlet feed conduit 122 between the inlet end 126 and the outlet end 128 and is operable to regulate flow through both the main inlet feed conduit 122 and in certain embodiments the primary fuel manifold 110. The fuel metering mechanism 146 can include all required instrumentation to validate gas fuel flow therethrough relative to a commanded flow.

In embodiments, a flow divider assembly 145 is fluidly connected to the outlet 128 end of the main inlet feed conduit 122 to received fuel from the fuel metering mechanism 146 and divide and issue flow from the main inlet feed conduit 122 into the combustor 108 and to the plurality of fuel nozzles 120 through the first fuel manifold 110 and the second fuel manifold 111. In embodiments, the inlet of the flow divider assembly is the outlet 128 of the main inlet conduit 122 and is a branch point for the primary manifold 110 and the secondary manifold 111 to divide the gaseous fuel between the manifolds 110, 111. The first fuel manifold 110 can be a primary fuel manifold configured to provide sufficient fuel during low fuel consumption such as during start up, and the second fuel manifold 111 can be a secondary fuel manifold configured to supplement the primary fuel manifold during high fuel consumption. For example, the engine 100 can use minimum of two fuel manifolds to regulate the gaseous fuel flow and corresponding back pressure over the full operating range of the engine 100. The primary manifold 100 can be used in starting, to provide a reduced nozzle count which is spread evenly around the engine 100. In applications, the reduced nozzle count can allow for a greater control of the gas flow being introduced through an increased restriction/back pressure, and can reduce the risk of over fueling on start. As engine power increases, the secondary manifold 111 is added to provide additional flow at the same gaseous supply pressure if needed or desired.

Fuel flow to the first and second fuel manifolds 110, 111 is controlled by a primary controlled flow valve 150 disposed in the first fuel manifold feed conduit 110a, and a secondary controlled flow valve 152 disposed in the second fuel manifold feed conduit 111a. The primary and secondary fuel flow valves 150, 152 each have an open condition operative to permit flow of fuel through the primary manifold feed conduit 122 and a closed condition operative to inhibit (e.g. reduce or completely block) flow of fuel through the primary manifold feed conduit 122. The first and second controlled flow valves 150, 152 can be any suitable controllable flow valve, such as solenoid valves operatively connected to a controller to selectively energize and de-energize the first and second flow valves 150, 152 to selectively allow flow through the first and second manifolds 110, 111 to the combustor 108. While two active valves 150, 152 are shown, it is contemplated that only the primary flow valve 150 can be an actively controlled valve and the secondary valve 152 can be passive. In certain embodiments, valves 150, 152 can be or include a globe valve, or a variable opening, electrically actuated valve. In certain such embodiments, instead of pulsing the valve 150, 152, the valve area can control the flow with a similar effect. In certain other embodiments, the valves 150, 152 can be a calibrated mechanical regulating valve, and once calibrated, provide a similar response and effect. In certain embodiments, the first and second controlled flow valves 150, 152 can be electrohydraulic servo valves operatively connected to the controller 144 to operate in a similar manner to provide a similar response and effect.

The controller 144 is operatively connected to control at least the primary fuel flow valve 150 to pulse a flow of gaseous fuel passing therethrough in pulse width modulation (PWM) pulses at a low end of a fuel flow range for the primary manifold 110. PWM control of the flow valve 150 can allow for high precision flow control even at low flow engine states. The same or a similar technique can still be beneficial to the secondary flow valve 152 in other engine states, even if the secondary fuel flow valve 152 remains closed during startup.

The controller 144 can include any suitable controller, for example an electronic engine controller (EEC). The controller 144 can be or include both hard wired circuits that cause a logic to be executed, and/or software-based components, for example, simple electric circuits employing analog sensors and/or components, or the controller 144 can include a CPU, a memory, machine readable instructions in the memory that when executed cause the CPU to perform a method. In certain embodiments, the controller 144 automatically controls the fuel flow valves 150, 152 and a fuel metering mechanism 146 (e.g. without user input). The controller 144 is operable to collect and process signals from a plurality of in-puts, including for example, a downstream temperature, an upstream and downstream pressure, and a delta pressure across the fuel metering mechanism to use and calculate a fuel flow schedule.

In certain embodiments, a fuel pressure sensor 154 (e.g. an absolute pressure) is operatively connected to an inlet of the fuel metering mechanism 146 and operable to generate a signal 155 indicative of the upstream fuel pressure at the inlet of the fuel metering mechanism 146. The controller 144 is operatively connected to the fuel pressure sensor and operable to receive the signal 155 from the fuel pressure sensor 154. The upstream pressure, and its respective signal 155, can have two functions for the controller 144 and fuel metering mechanism 146. First, the controller 144 can use the upstream pressure for validating that the inlet pressure of the fuel metering mechanism 146 is sufficient for operation at the intended operating condition (e.g. start-up or based on the commanded power). Second, the controller 144 can use the upstream pressure for correcting a position of the opening of the fuel metering mechanism 146 relative to the gaseous fuel compressibility at the rated pressure.

In certain embodiments, a position feedback sensor 148 is operatively connected to the fuel metering mechanism 146 and operable to generate a signal 149 indicative of an actual position of the fuel metering mechanism. The position feedback sensor 148 can be or include any suitable position sensor, for example a linear variable differential transformer (LVDT). Because the accuracy of a valve actuator system (e.g. a torque motor driver) may vary with operating conditions (e.g. fluid temperature, pressure, ambient conditions), a direct measurement of actual position (or rate of change of position) of the fuel metering mechanism 146 allows for a more precise control and calculation of metered flow.

In embodiments, the controller 144 is operatively connected to the position sensor 148, and is therefore is operable to control the position of the electronic metering valve 146 based on the each of the signal indicative of an upstream pressure 155 and the signal 149 of the position of the fuel metering mechanism 146, and in certain embodiments, a command power for a desired power output of the aircraft engine 100 to achieve the desired power output (e.g. as simultaneous inputs). Upon receipt of a command power to the controller 144, the position of the fuel metering mechanism 146 is ultimately driven by a driver operatively connected to the fuel metering mechanism 146.

In certain embodiments, a delta pressure sensor 156 is operatively connected to the inlet of the fuel metering mechanism 146 and outlet of the of the fuel metering mechanism 146 and is operable to generate a signal 157 indicative of a pressure drop across the fuel metering mechanism 146. The delta pressure sensor 156 provides the differential pressure across the metering mechanism 146 itself for a given opening position (e.g. in conjunction with the correction factors) and can be used to measure the gas flow rate through the fuel metering mechanism 146, for example. In certain embodiments, the delta pressure sensor 156 can be a differential pressure sensor connected to a pressure tap the main inlet feed conduit 122 at the inlet and outlet of the fuel metering mechanism 146, the delta pressure sensor 156 itself determining the pressure differential. It is also contemplated that the delta pressure sensor 156 can be an electronic device connecting to separate absolute pressure sensors located at each of the inlet and outlet of the fuel metering mechanism 146, where the electronic device includes a module of the controller 144 that simply takes the difference between the signals for each individual sensor.

In certain such embodiments, the controller 144 is operatively connected to the delta pressure sensor 156 and operable to receive the signal 157 from the delta pressure sensor 156, and is operable to measure a gaseous fuel flow rate through the fuel metering mechanism 146 based on the pressure drop and an adjusted position of the fuel metering mechanism (e.g. the corrected position as described above).

In certain embodiments, a temperature sensor 158 is operatively connected to the outlet of the fuel metering mechanism 146 and operable to generate a signal indicative 159 of a temperature of the gaseous fuel at the outlet of the fuel metering mechanism 146. The temperature sensor 158 measures the gas flow temperature at the outlet of the fuel metering mechanism 146 and can also be used to provide a correction factor for the position of the fuel metering mechanism 146. Because the gas temperature will increase as it passes through the fuel metering mechanism 146 due to the Joule Thomson effect, the temperature correction factor can then be used by the controller 144 to control the position of the fuel metering mechanism 146 as a function of the correction factor. Therefore, in certain such embodiments, the controller 144 is operatively connected to the temperature sensor 158 and is operable to output a temperature correction factor to control the position of the fuel metering mechanism 146 based on the signal 159 indicative of the temperature of the gaseous fuel flow at the outlet of the fuel metering mechanism 146.

In certain embodiments, a downstream pressure sensor 160 is disposed in the main inlet feed conduit 122 at an inlet (e.g. outlet 128 of main inlet feed conduit 122) of the flow divider assembly 145 downstream of the fuel metering mechanism 146 and upstream of the combustor 108, the sensor 160 being operable to generate a signal 161 indicative of a fuel pressure at the inlet of the flow divider assembly 145. The downstream pressure sensor 160 can be an absolute pressure transducer and can be used in 'open loop' operation, when compressibility of the gaseous fuel may be transient in nature as the supply lines are filled/primed with the gaseous fuel. In conjunction with the flow divider 145 architecture, the downstream pressure sensor 160 allows the controller 144 (e.g. via signal 161) to control the metering mechanism 146 to be used as secondary pressure regulator to improve the metering accuracy at certain engine conditions (e.g. low flow operating conditions). Additionally, by locating the sensor 160 downstream of the fuel metering mechanism 146, the commanded flow can be trimmed to accommodate for any line losses in between the metering valve and the fuel manifold inlet.

Each of the signals, including the signal 149 indicative of a position of the fuel metering mechanism 146, the signal 155 indicative of a fuel pressure at the inlet of the fuel metering mechanism 146, the signal 157 indicative of the pressure drop across the fuel metering mechanism 146, the signal 159 indicative of a fuel temperature at the outlet of the fuel metering mechanism 158, and the signal 161 indicative of the pressure at the inlet of the flow divider assembly 145, can be input into a control algorithm executable at least in part by the controller 144 to generate a control signal as an output based on the plurality of inputs. Accordingly, the controller 144 is operable to control both the fuel metering mechanism 146 and each of the controllable flow valves 150, 152 by sending the control signal to the metering mechanism 146 and to each of the flow valves 150, 152. In embodiments, the algorithm could be constructed using the functionality as described above in addition to known general engineering principles as applied to the specific characteristics of each particular fuel system to which the technology of the present disclosure is applied.

In certain embodiments, the controller 144 includes machine readable instructions to cause the controller to perform a method, for example, a fuel control method for the gas turbine engine. The method includes placing a primary fuel flow valve (e.g. primary flow valve 150) and a secondary fuel flow valve (e.g. secondary flow valve 152) in respective closed positions, pressurizing a main inlet feed conduit (conduit 122) feeding the primary and secondary fuel flow valves with a flow of gaseous fuel (e.g. from fuel supply 124), placing the primary fuel flow valve into an open condition to supply the flow of gaseous fuel to a first plurality of fuel injectors (e.g. injectors 120a) of a primary fuel manifold (e.g. primary manifold 110a) downstream of the primary fuel flow valve, and modulating the primary fuel flow valve between its open and closed position to pulse a flow of gaseous fuel passing therethrough in PWM pulses at a low end of a fuel flow range for the primary manifold.

In certain embodiments, the method includes, scheduling a PWM dwell time relative to sensed engine conditions (e.g. downstream temperature or pressure). As used herein, dwell time refers to the amount of time the flow valve is in the open position, for example, increasing the PWM dwell time will increase the opening of the fuel flow valve. In embodiments, the method further includes scheduling a position of the fuel metering mechanism relative to a sensed pressure at an inlet of a flow divider assembly (e.g. flow divider assembly 145). In certain embodiments, the method includes modulating the secondary fuel flow valve between its open and closed position to pulse a flow of gaseous fuel passing therethrough in pulse width modulation (PWM) pulses at a low end of a fuel flow range for the secondary manifold to prevent surge or notch when placing the secondary fuel flow valve its opened position.

In certain embodiments, on engine start-up for example, both fuel flow valves 150, 152 can be held in the closed position while the fuel metering mechanism 146 is in an open position to allow the priming and pressurization of the main inlet feed conduit 122 to pressurize the conduit 122. Once pressurized and primed, the primary flow valve 150 can be moved to the open position to allow gas flow into the primary manifold 100. Priming and/or pre-pressurizing the conduit 122 can ensure the fuel velocity when entering the manifold are sufficiently high to pre-vent flashback of the gaseous fuel upon ignition. With the fuel flow valve 150 open for the primary manifold 110, the fuel metering mechanism 146 can be adjusted to maintain the required pressure at the inlet of the flow divider assembly 145. As engine speed/power increases, the secondary manifold flow valve 152 can be opened to allow gas flow into the secondary manifold 111. Similar to the primary manifold 110, flow into the secondary manifold 111 will occur at a flow divider inlet pressure where the gas pressure will result in a sufficiently high velocity gaseous flow into the secondary manifold 111 to prevent flash back.

With both fuel flow valves 150, 152 open, fuel scheduling can then be solely controlled by the fuel metering mechanism based off of the inputs to the controller 144 (e.g. inputs as de-scribed above in addition to pilot command, engine power, engine speed, operating parameters for temperature, pressure, altitude).

Since the gaseous supply 124 is maintained at a sufficiently high pressure to obtain the required gas flow at high power, the low flow operating conditions (i.e. engine start)

require a significant pressure drop to be imposed on the fuel to accurately meter the flow. With the fuel in a compressible, gaseous state, this can lead to a loss of fidelity in the metering due to the fuel reaching trans sonic and sonic speeds within the metering valve. With the active control of fuel flow valves 150, 152 in the fuel manifolds 110, 111, it is possible to use the flow divider 145 as a second metering mechanism, allowing the gas pressure to be reduced in steps, restoring some of the fidelity in metering control.

To improve the metering fidelity and control in low flow conditions, in certain embodiments, the fuel metering mechanism 146 can be scheduled to provide a targeted flow divider in-let pressure which may be higher than the required pressure for the given operating condition. In that case, once the pressure is stabilized, the primary fuel flow valve 150 current can then be pulse width modulated (PWM) by the controller 144, which controls the flow valve's 150, 152 opening time per second, effectively simulating a smaller restriction than if the valves were just set to the wide open position. Therefore, while operating the engine 100, the PWM dwell time can be scheduled relative to the appropriate engine parameters (i.e. downstream temperature or pressure) while the position of the fuel metering mechanism 146 can be scheduled relative to the pressure at the inlet of the flow divider 145. A similar technique can be used when engaging the secondary manifold to prevent any 'surge' or 'notch' felt when adding the additional nozzle flows.

As will be appreciated by those skilled in the art, aspects of the present disclosure may be embodied as a system, method or computer program product. Accordingly, aspects of this dis-closure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this dis-closure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products ac-cording to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a ma-chine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be per-formed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed here-in can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

For example, the following particular embodiments of the present technology are likewise contemplated, as described herein next by clauses.

Clause 1. A fuel system (200) for a gas turbine engine (100) of an aircraft (1) comprising:

a main inlet feed conduit (122) fluidly connected to a primary manifold feed conduit (110*a*) and to feed a secondary manifold feed conduit (111*a*);

a primary manifold (110) fluidly connecting the primary manifold feed conduit to a plurality of primary fuel injectors (120*a*);

a secondary manifold (111) fluidly connecting the secondary manifold feed conduit to a plurality of secondary fuel injectors (120*b*);

a primary fuel flow valve (150) disposed in the primary manifold feed conduit wherein the primary fuel flow valve has an open condition operative to permit flow of fuel through the primary manifold feed conduit and a closed condition operative to inhibit flow of fuel through the primary manifold feed conduit;

a secondary fuel flow valve (152) disposed in the secondary manifold feed conduit wherein the secondary fuel flow valve has an open condition operative to permit flow of fuel through the secondary manifold feed conduit and a closed condition operative to inhibit flow of fuel through the secondary manifold feed conduit; and a controller (144) operatively connected to control the primary fuel flow valve, wherein the controller is operable to control the primary fuel flow valve to pulse a flow of fuel passing therethrough in pulse width modulation (PWM) pulses at a low end of a fuel flow range for the primary manifold.

Clause 2. The fuel system as recited in clause 1, wherein the controller is operable to control the secondary fuel flow valve to pulse a flow of fuel passing therethrough in pulse width modulation (PWM) pulses at a low end of a fuel flow range for the secondary manifold.

Clause 3. The fuel system as recited in clause 1, further comprising a gaseous fuel source (124) defining an inlet end (126) of the main inlet feed conduit to supply gaseous fuel to the primary fuel manifold via the main inlet feed conduit.

Clause 4. The fuel system as recited in clause 1, further comprising a fuel metering mechanism (146) disposed in the main inlet feed conduit operable to regulate flow through both the main inlet feed conduit and the primary fuel manifold.

Clause 5. The fuel system as recited in clause 4, wherein the controller includes machine readable instructions to cause the controller to:

place the primary fuel control valve and the secondary fuel flow valve in respective closed positions;

pressurize the main inlet feed conduit feeding the primary and secondary fuel flow valve valves with gaseous fuel;

place the primary fuel flow valve into its open condition to supply the gaseous fuel to fuel injectors of the primary manifold downstream from the primary fuel flow valve; and modulate the primary fuel flow valve between its open and closed position to pulse a flow of gaseous fuel passing therethrough in pulse width modulation (PWM) pulses at a low end of a fuel flow range for the primary manifold.

Clause 6. The fuel system as recited in clause 5, wherein the controller includes machine readable instructions to cause the controller to:

schedule a PWM dwell time relative to sensed engine conditions; and schedule a position of the fuel metering mechanism relative to a sensed pressure at an in-let of a flow divider assembly.

Clause 7. The fuel system as recited in clause 6, wherein the sensed engine conditions derive from signals indicative of at least one of: a pressure at an inlet of the fuel metering mechanism, a pressure drop across the fuel metering mechanism, a temperature of the gaseous fuel at an outlet of the fuel metering mechanism, and/or a position of the fuel metering mechanism, and wherein the sensed pressure at the inlet of the flow divider assembly is derived from a signal indicative of the pressure at the inlet of the flow divider assembly.

Clause 8. The fuel system as recited in Claus 7, wherein the controller includes machine readable instructions to cause the controller to:

modulate the secondary fuel flow valve between its open and closed position to pulse a flow of gaseous fuel passing therethrough in pulse width modulation (PWM) pulses at a low end of a fuel flow range for the secondary manifold to prevent surge or notch when placing the secondary fuel flow valve its opened position.

Claus 9. The fuel system as recited in clause 1, further comprising a gas turbine engine (100) having in fluid series communication, a compressor section (102), a combustor (108), and a turbine section (116), wherein an outlet (128) of the main inlet feed conduit is fluidly connected to the combustor via the primary and secondary fuel manifolds, and wherein the controller is an electronic engine control (EEC) of the gas turbine engine.

Clause 10. The fuel control system as recited in clause 1, further comprising: a fuel pressure sensor (154) operatively connected to an inlet of the of the fuel metering mechanism and operable to generate a signal (155) indicative of a fuel pressure at the inlet of the fuel metering mechanism, wherein the controller is operatively connected to the fuel pressure sensor and operable to receive the signal from the fuel pressure sensor, wherein the controller is operable to validate whether an inlet pressure is sufficient for operation at the intended operating condition and/or to adjust a position of the fuel metering mechanism relative to a gaseous fuel compressibility at a rated pressure.

Clause 11. The fuel system as recited in clause 10, further comprising: a position feedback sensor (148) operatively connected to the fuel metering mechanism and operable to generate a signal (149) indicative of a position of the fuel metering mechanism, wherein the controller is operatively connected to the position sensor, wherein the controller is operable to control the position of the fuel metering mechanism based on the signal indicative of the position of the fuel metering mechanism.

Clause 12. The fuel system as recited in clause 11, further comprising: a delta pressure sensor (156) operatively connected to the inlet of the fuel metering mechanism and outlet of the of the fuel metering mechanism and operable to generate a signal (157) indicative of a pressure drop across the fuel metering mechanism, wherein the controller is operatively connected to the delta pressure sensor and operable to receive the signal from the delta pressure sensor, wherein the controller is operable to measure a gaseous fuel flow rate through the fuel metering mechanism based on the pressure drop and an adjusted position of the fuel metering mechanism.

Clause 13. The fuel system as recited in clause 12, further comprising: a temperature sensor (158) operatively connected to the main inlet feed conduit at the outlet of the fuel metering mechanism and operable to generate a signal (159) indicative of a temperature of the gaseous fuel at the outlet of the fuel metering mechanism, wherein the controller is operatively connected to the temperature sensor, and wherein the controller is operable to output a temperature correction factor and control the position of the fuel metering mechanism based on the signal indicative of the temperature of the gaseous fuel flow at the outlet of the fuel metering mechanism.

Clause 14. The fuel system as recited in clause 13, further comprising a downstream pressure sensor (160) disposed in the main inlet feed conduit at an inlet of a flow divider assembly (145) downstream of the fuel metering mechanism operable to generate a signal (161) indicative of a fuel pressure at the inlet of the flow divider assembly, wherein the controller is operatively connected to the downstream pressure sensor and operable to receive the signal from the downstream pressure sensor, wherein the controller is operable to control the fuel metering mechanism to act as a pressure regulator in low flow operating conditions.

Clause 15. A flow divider assembly (145) for an aircraft fuel system, comprising:

a flow divider having an inlet (128) operable to divide a flow of gaseous fuel from a main inlet feed conduit (122) into a primary manifold feed conduit (110a) and a secondary manifold feed conduit (110b);

a pressure sensor (154) disposed in the main inlet feed conduit at the inlet of the flow divider operable to generate a signal (155) indicative of a fuel pressure at the inlet of the flow divider;

a primary fuel flow valve (150) disposed in the primary manifold feed conduit wherein the primary fuel flow valve has an open condition operative to permit flow of fuel through the primary manifold feed conduit and a closed condition operative to inhibit flow of fuel through the primary manifold feed conduit;

a secondary fuel flow valve (152) disposed in the secondary manifold feed conduit wherein the secondary fuel flow valve has an open condition operative to permit flow of fuel through the secondary manifold feed conduit and a closed condition operative to inhibit flow of fuel through the secondary manifold feed conduit; and a controller (144) operatively connected to control the primary and secondary fuel flow valves and operable to control the primary and secondary fuel flow valves to pulse a flow of fuel passing therethrough in pulse width modulation (PWM) pulses, wherein the controller is operatively connected to the pressure sensor and operable to receive a signal indicative of a pressure at the inlet of the flow divider assembly, wherein the controller is operable to control a fuel metering mechanism (146) to act as a pressure regulator in low flow operating conditions based on the signal indicative of a pressure at the inlet of the flow divider assembly.

Clause 16. A fuel control method for a gas turbine engine comprising:

placing a primary fuel flow valve (150) and a secondary fuel flow valve (152) in respective closed positions;

pressurizing a main inlet feed conduit (122) feeding the primary and secondary fuel flow valves with a flow of gaseous fuel;

placing the primary fuel flow valve into an open condition to supply the flow of gaseous fuel to a first plurality of fuel injectors of a primary fuel manifold (110) downstream of the primary fuel flow valve; and modulating the primary flow valve between its open and closed position to pulse a flow of gaseous fuel passing therethrough in pulse width modulation (PWM) pulses at a low end of a fuel flow range for the primary manifold.

Clause 17. The fuel control method as recited in clause 16, further comprising:

scheduling a PWM dwell time relative to sensed engine conditions; and scheduling a position of a fuel metering mechanism (146) relative to a sensed pressure at an inlet of a flow divider assembly (145).

Clause 18. The fuel control method as recited in clause 17, further comprising modulating the secondary fuel flow valve between its open and closed position to pulse a flow of gaseous fuel passing therethrough in pulse width modulation (PWM) pulses at a low end of a fuel flow range for the secondary manifold to prevent surge or notch when placing the secondary fuel flow valve its opened position.

Clause 19. The fuel control method as recited in clause 18, wherein the sensed engine conditions derive from signals indicative of at least one of: a pressure at an inlet of the fuel metering mechanism, a pressure drop across the fuel metering mechanism, a temperature of the gaseous fuel at an outlet of the fuel metering mechanism, and/or a position of the fuel metering mechanism, and further comprising:

controlling a positon of the fuel metering mechanism and the PWM pulses of the first and second flow valves based on the plurality of sensed inputs.

Clause 20. The fuel control method as recited in clause 19, wherein the sensed pressure at the inlet of the flow divider assembly is derived from a signal (161) indicative of the pressure at the inlet of the flow divider assembly, and further comprising:

controlling the fuel metering mechanism to act as a pressure regulator in low flow operating conditions based on the sensed input.

What is claimed is:

1. A fuel system for an aircraft engine that burns gaseous fuel, the fuel system comprising:
    a gaseous fuel supply configured to provide the gaseous fuel;
    a main inlet feed conduit fluidly connecting the gaseous fuel supply to a primary manifold feed conduit and to a secondary manifold feed conduit;
    a primary manifold fluidly connecting the primary manifold feed conduit to a plurality of primary fuel injectors;
    a secondary manifold fluidly connecting the secondary manifold feed conduit to a plurality of secondary fuel injectors;
    a fuel regulator disposed in the main inlet feed conduit upstream of the primary manifold and the secondary manifold, the fuel regulator operable to regulate flow through at least the main inlet feed conduit and the primary manifold;
    a primary fuel flow valve disposed in the primary manifold feed conduit downstream of the fuel regulator, the primary fuel flow valve being a first pulse width modulation (PWM) valve, wherein the primary fuel flow valve has an open condition operative to permit flow of fuel through the primary manifold feed conduit and a closed condition operative to inhibit flow of fuel through the primary manifold feed conduit;
    a secondary fuel flow valve disposed in the secondary manifold feed conduit downstream of the fuel regulator, wherein the secondary fuel flow valve has an open condition operative to permit flow of fuel through the secondary manifold feed conduit and a closed condition operative to inhibit flow of fuel through the secondary manifold feed conduit; and
    a controller operatively connected to the first PWM valve, wherein the controller is configured to control the first PWM valve, when in the open condition, to pulse a flow of the gaseous fuel fed to the primary fuel injectors to regulate a fuel flow exiting the primary fuel injectors.

2. The fuel system as recited in claim 1, wherein the secondary fuel flow valve is a second pulse width modulation (PWM) valve, the controller being configured to control the second PWM valve to pulse a flow of fuel passing therethrough in pulse width modulation (PWM) pulses for the secondary manifold.

3. The fuel system as recited in claim 1, wherein the controller includes machine readable instructions to cause the controller to:
    place the primary fuel flow valve and the secondary fuel flow valve in the respective closed conditions;
    pressurize the main inlet feed conduit feeding the primary and secondary fuel flow valves with the gaseous fuel; and
    place the primary fuel flow valve into the open condition to supply the gaseous fuel to the primary fuel injectors.

4. The fuel system as recited in claim 3, wherein the controller includes machine readable instructions to cause the controller to:
    schedule a PWM dwell time relative to sensed engine conditions; and
    schedule a position of the fuel regulator relative to a sensed pressure at an inlet of a flow divider.

5. The fuel system as recited in claim 4, wherein the sensed engine conditions derive from signals indicative of at least one of: a pressure at an inlet of the fuel regulator, a pressure drop across the fuel regulator, a temperature of the gaseous fuel at an outlet of the fuel regulator, and/or a position of the fuel regulator, and wherein the sensed pressure at the inlet of the flow divider is derived from a signal indicative of the pressure at the inlet of the flow divider.

6. The fuel system as recited in claim 5, wherein the controller includes machine readable instructions to cause the controller to:
    modulate the second PWM valve to pulse the flow of the gaseous fuel passing therethrough in pulse width modulation (PWM) pulses for the secondary manifold when placing the secondary fuel flow valve in the open condition.

7. The fuel system as recited in claim 1, further comprising the aircraft engine, the aircraft engine being a gas turbine engine having in fluid series communication, a compressor section, a combustor, and a turbine section, wherein an outlet of the main inlet feed conduit is fluidly connected to the combustor via the primary and secondary fuel manifolds, and wherein the controller is an electronic engine control (EEC) of the gas turbine engine.

8. The fuel control system as recited in claim 1, further comprising: a fuel pressure sensor operatively connected to an inlet of the fuel regulator and operable to generate a signal indicative of a fuel pressure at the inlet of the fuel regulator, wherein the controller is operatively connected to the fuel pressure sensor and operable to receive the signal from the fuel pressure sensor, wherein the controller is configured to validate whether an inlet pressure is sufficient for operation at the intended operating condition and/or to adjust a position of the fuel regulator relative to a gaseous fuel compressibility at a rated pressure.

9. The fuel system as recited in claim 8, further comprising: a position feedback sensor operatively connected to the fuel regulator and operable to generate a signal indicative of a position of the fuel regulator; and wherein the controller is operatively connected to the position sensor, wherein the controller is configured to control the position of the fuel regulator based on the signal indicative of the position of the fuel regulator.

10. The fuel system as recited in claim 9, further comprising: a delta pressure sensor operatively connected to the inlet of the fuel regulator and an outlet of the of the fuel regulator and operable to generate a signal indicative of a pressure drop across the fuel regulator, wherein the controller is operatively connected to the delta pressure sensor and operable to receive the signal from the delta pressure sensor, wherein the controller is configured to measure a gaseous fuel flow rate through the fuel regulator based on the pressure drop and an adjusted position of the fuel regulator.

11. The fuel system as recited in claim 10, further comprising: a temperature sensor operatively connected to the main inlet feed conduit at the outlet of the fuel regulator and operable to generate a signal indicative of a temperature of the gaseous fuel at the outlet of the fuel regulator, wherein the controller is operatively connected to the temperature sensor, and wherein the controller is configured to output a temperature correction factor and control the position of the fuel regulator based on the signal indicative of the temperature of the gaseous fuel flow at the outlet of the fuel regulator.

12. The fuel system as recited in claim 11, further comprising a downstream pressure sensor disposed in the main inlet feed conduit at an inlet of a flow divider downstream of the fuel regulator operable to generate a signal indicative of a fuel pressure at the inlet of the flow divider, wherein the controller is operatively connected to the downstream pressure sensor and operable to receive the signal from the downstream pressure sensor, wherein the controller is configured to control the fuel regulator to act as a pressure regulator for the gaseous fuel.

\* \* \* \* \*